(12) United States Patent
Bilionis et al.

(10) Patent No.: US 10,087,572 B2
(45) Date of Patent: Oct. 2, 2018

(54) WASHING MACHINE (71) Applicant: WHIRLPOOL CORPORATION, Benton Harbor, MI (US)

(72) Inventors: Peter I. Bilionis, Saint Joseph, MI (US); Timothy E. Heater, Hartford, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/434,527

(22) Filed: Feb. 16, 2017

(65) Prior Publication Data

US 2018/0230640 A1    Aug. 16, 2018

(51) Int. Cl.
| | |
|---|---|
| *D06F 58/28* | (2006.01) |
| *D06F 33/02* | (2006.01) |
| *D06F 35/00* | (2006.01) |
| *D06F 39/04* | (2006.01) |
| *D06F 29/00* | (2006.01) |

(52) U.S. Cl.
CPC ............ *D06F 58/28* (2013.01); *D06F 29/005* (2013.01); *D06F 33/02* (2013.01); *D06F 35/00* (2013.01); *D06F 39/04* (2013.01); *D06F 2058/289* (2013.01); *D06F 2202/12* (2013.01); *D06F 2204/04* (2013.01)

(58) Field of Classification Search
CPC ........ D06F 58/28; D06F 29/005; D06F 33/02; D06F 39/04; D06F 2058/289; D06F 2202/12; D06F 2204/04
USPC .......................... 34/427, 595–610; 68/5 R, 19
See application file for complete search history.

(56) References Cited

U.S. PATENT DOCUMENTS

| | | | | |
|---|---|---|---|---|
| 2,858,688 | A * | 11/1958 | Smith | ..................... D06F 25/00 34/596 |
| 2,885,789 | A * | 5/1959 | Conkling | ................ D06F 58/28 34/547 |
| 2,919,493 | A * | 1/1960 | Candor | ................... D06F 58/28 34/549 |
| 2,936,605 | A * | 5/1960 | Loutrel | ................... D06F 13/02 134/112 |
| 3,186,104 | A * | 6/1965 | Stilwell, Jr. | ............. D06F 33/02 210/144 |
| 3,540,241 | A | 11/1970 | Jacobs | |
| 4,397,101 | A * | 8/1983 | Rickard | ................. D06F 58/28 34/486 |
| 4,663,948 | A | 5/1987 | Rummel | |

(Continued)

FOREIGN PATENT DOCUMENTS

| | | |
|---|---|---|
| DE | 102009026528 A1 | 12/2010 |
| DE | 202010018225 U1 * | 10/2014 ............. D06F 25/00 |

(Continued)

*Primary Examiner* — Stephen M Gravini (57) ABSTRACT

A pair of laundry treating appliances having power sharing capabilities through a piggyback plug with a rear facing electric socket. The rear facing electric socket is designed to receive a power plug from a compatible laundry treating appliance. The piggyback plug is connected to a terminal block of one of the laundry treating appliance wherein the terminal block is adapted to be selectively connected to one of a 120V or 240V electric power source. A controller is adapted with an algorithm to prevent electrical overloading by automatically reducing the electrical power consumed by one of the appliance when simultaneous energization of both appliances occur.

10 Claims, 9 Drawing Sheets

(56) References Cited

U.S. PATENT DOCUMENTS

| | | | | |
|---|---|---|---|---|
| 5,852,881 A * | 12/1998 | Kuroda | .................... | D06F 58/28 34/527 |
| 6,199,300 B1 * | 3/2001 | Heater | .................... | D06F 58/28 34/446 |
| 6,597,144 B2 * | 7/2003 | Pearson | .................... | D06F 33/02 318/599 |
| 6,924,466 B2 | 8/2005 | Lee | | |
| 7,062,863 B2 * | 6/2006 | Chung | .................... | D06F 25/00 134/40 |
| 7,096,601 B2 * | 8/2006 | Lyu | .................... | D06F 29/00 34/595 |
| 7,146,749 B2 * | 12/2006 | Barron | .................... | D06F 35/00 34/596 |
| 7,399,205 B2 | 7/2008 | McNeely et al. | | |
| 7,571,553 B2 * | 8/2009 | Joerger | .................... | D06F 39/005 34/378 |
| 8,155,120 B2 | 4/2012 | McCoy et al. | | |
| 8,201,345 B2 * | 6/2012 | Dalton | .................... | D06F 58/28 34/389 |
| 8,345,686 B2 | 1/2013 | McCoy et al. | | |
| 8,375,599 B2 * | 2/2013 | Dey | .................... | D06F 58/28 34/595 |
| 8,380,355 B2 | 2/2013 | Mayleben et al. | | |
| 8,424,347 B2 * | 4/2013 | Maekawa | .................... | D06F 25/00 68/12.16 |
| 8,637,795 B2 | 1/2014 | Giri et al. | | |
| 9,133,575 B2 * | 9/2015 | Hong | .................... | D06F 25/00 |
| 9,139,951 B2 * | 9/2015 | Bellinger | .................... | D06F 58/26 |
| 9,356,542 B2 * | 5/2016 | Ragogna | .................... | D06F 58/206 |
| 9,518,350 B2 * | 12/2016 | Dokonal | .................... | D06F 33/02 |
| 9,534,329 B2 * | 1/2017 | Contarini | .................... | D06F 39/02 |
| 9,816,223 B2 * | 11/2017 | Bae | .................... | D06F 58/22 |
| 9,845,567 B2 * | 12/2017 | Contarini | .................... | D06F 58/24 |
| 9,850,614 B2 * | 12/2017 | Chiriatti | .................... | D06F 37/20 |
| 2014/0338218 A1 * | 11/2014 | Contarini | .................... | D06F 39/02 34/493 |
| 2015/0308034 A1 * | 10/2015 | Cavarretta | .................... | D06F 58/28 62/79 |
| 2017/0211224 A1 * | 7/2017 | Rizzi | .................... | D06F 58/28 |

FOREIGN PATENT DOCUMENTS

| | | | | |
|---|---|---|---|---|
| EP | 1640824 A1 | 3/2006 | | |
| EP | 1970483 A1 * | 9/2008 | .............. | D06F 58/28 |
| EP | 2495362 A1 * | 9/2012 | .............. | D06F 25/00 |
| EP | 2612963 A1 * | 7/2013 | .............. | D06F 39/02 |
| EP | 2495362 A4 * | 7/2015 | .............. | D06F 25/00 |
| EP | 2612963 B1 * | 3/2016 | .............. | D06F 39/02 |
| EP | 2495362 B1 * | 10/2017 | .............. | D06F 25/00 |
| KR | 100949640 B1 * | 3/2010 | .............. | D06F 58/28 |
| WO | WO 2011052154 A1 * | 5/2011 | .............. | D06F 25/00 |

* cited by examiner

WASHING MACHINE

BACKGROUND OF THE INVENTION

Laundry treating appliances, such as washing machines or dryers, typically include a rotatable drum or tub driven by an electrically energized motor, and a heating system to heat air and/or water supplied to the appliances. These appliances are usually provided with independent terminal blocks to be connected to either a 120V or a 240V power source. Some dryers may also be wired for 120V to power accessories.

BRIEF DESCRIPTION

In one aspect of the invention, a washing machine is adapted to interoperate with a dryer. The washing machine includes a laundry treating chamber, a terminal block adapted to connect to a 240V power supply, at least one heating element to provide heat to the laundry treating chamber, and an electrical circuit between the terminal block and the at least one heating element. A controller is connected to the electrical circuit and configured to control cycles of operation the washing machine and to communicate with the dryer. The controller is further configured to switch operation of the washing machine between two power levels in response to operational characteristics of the dryer.

In another aspect of the invention, a washing machine includes a laundry treating chamber, at least one heating element arranged to supply heat to the laundry treating chamber and configured to draw power at first and second power levels, and a terminal block connected to a heating element or elements and configured to be connected to at least one power source. A relay circuit is coupled between the heating element or elements and the terminal block to switch the heating element between the first and second power levels. A controller is operably coupled to the heating element and to the relay circuit and is configured to signal the relay circuit to switch the heating element or elements between the first and second power levels.

A further aspect of the invention includes a method of sharing power between a washing machine and a dryer, each having at least one heating element and configured to perform a cycle of operation, and both connected to a shared power source. The method includes allocating power between the washing machine and the dryer by adjusting operation of respective heating elements in the washing machine and the dryer.

DETAILED DESCRIPTION

A laundry system according to aspects of the invention comprises a washing machine 10, a dryer 12, and at least one electrical power source 25, which can be shared to provide power for both appliances 10, 12. The laundry system can include other conventional appliances for washing and drying fabric items, such as clothes and linens Examples of other laundry appliances can include, but are not limited to, a washing machine, including top-loading, front-loading, vertical axis, and horizontal axis washing machines, a dryer, such as a tumble dryer, including top-loading dryers and front-loading dryers, a combination washing machine and dryer, a tumbling refreshing machine, an extractor, and a non-aqueous washing apparatus. The laundry appliances can be the same type of laundry appliance, such as two washing machines, or different types of laundry appliances, such as a washing machine and a dryer.

Typically, in the U.S. a washing machine operates with a lower power source than a dryer. For example, the washing machine may operate with a 120V, 15 A power source while the dryer may operate with a 240V, 30 A power source. Systems in accordance with the present disclosure provide a washer configured with the capability to utilize a higher powered source (e.g., a 240V, 30 A power circuit) that is commonly used for the dryer to allow the use of a more powerful heating element without overloading the typical washing machine power circuit. Exemplary embodiments set forth below will be described with reference to a higher powered 240V, 30 A power source and a lower powered 120V, 15 A power source, though other types of power sources are within the scope of the present disclosure.

Washing machines in accordance with the present disclosure can be configured to run at either 240V, 30 A or 120V, 15 A, even when plugged into a 240V, 30 A power source, which can be a dedicated 240V, 30 A power source or piggybacked onto the 240V, 30 A power source for the dryer. In certain embodiments, the washing machine 10 can be configured to share a 240V, 30 A power supply with the dryer 12, in which case the dryer 12 is also configured to selectively run at either 240V, 30 A or 120V, 15 A, even when plugged into the 240V, 30 A power source. This enables the washing machine and the dryer to efficiently "share" available power. For example, when either the washing machine 10 and dryer 12 are running alone, each may use the 240V, 30 A power source; whereas if they are simultaneously running, the washing machine 10 and the dryer 12 may be configured to always runs on 120V, 15 A. Other embodiments use more sophisticated forms of "sharing," such as "smart" technologies in which the voltage demands of one or both of the washing machine 10 and dryer 12 are monitored or sensed and the power is allocated accordingly.

For example, in one embodiment it is contemplated that both the washing machine 10 and dryer 12 each have two 120V heating elements. If both the washing machine 10 and dryer 12 are simultaneously demanding the actuation of a heating element, then both would operate just one of their respective heating elements, resulting in each of the washing machine 10 and dryer 12 drawing 120V, 15 A. If both the washing machine 10 and dryer 12 are running but only one of them is demanding the actuation of a heating element, then that appliance can draw the full 240V, 30 A to energize both heating elements. In another embodiment, instead of two discrete 120V heating elements, either or both the washing machine 10 and dryer 12 can have a variable output heating element, which would provide for essentially any division of the 240V, 30 A supply between the washing machine 10 and the dryer 12. In yet a further embodiment, either or both the washing machine 10 and the dryer 12 can have one 120V heating element and one 240V heating element. If both the washing machine 10 and dryer 12 are simultaneously demanding the actuation of a heating element, then both would operate the 120V heating elements. If both the washing machine 10 and dryer 12 are running but only one of them is demanding the actuation of a heating element, then that one can draw the full 240V, 30 A to energize the 240V heating element. The "smart" control can also take into account power demands from other electrical components, especially those that consume a greater portion of the power, such as the motors, for example.

While the specific examples of power supply in this disclosure are for 240V and 120V power supplies, the disclosure has applicability to other combinations of power supplies, and is not limited to a 240V/120V configuration. For example, while in the United States, 240V and 120V power supplies are standard, in other countries, other voltages are standard.

Figure 1:
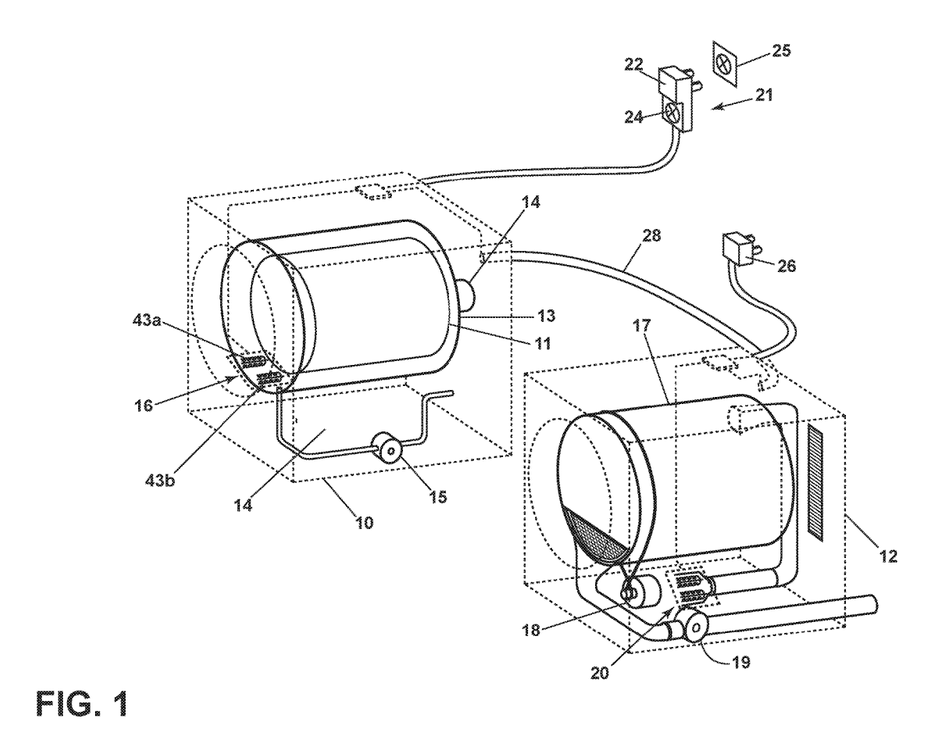
FIG. 1 is a schematic three-dimensional view of a washing machine and dryer with power sharing capability through a terminal block with a communication module.

FIG. 1 illustrates an exemplary washing machine 10 and dryer 12, which are configured to implement one or more of these aspects of the invention. For simplicity sake, the washing machine 10 and dryer 12 are defined by schematic three-dimensional cubes. As a non-limiting example, the washing machine 10 can include a fixed outer tub 11 and a rotatable inner basket or drum 13 being driven by an electrically energized motor 14. A water pump 15 is provided for supplying water to or extracting water from the tub 11 or drum 13. The washing machine 10 can be provided with a heating system which can include at least one heating element 16 for heating washing liquid supplied to the washing machine 10. In this embodiment there a two heating elements 43a, 43b. One heating element 43a is operable at 120V and the other heating element 43b is operable at 240V. As mentioned above, it is contemplated that other embodiments may have two 120V elements or a single variable output heating element in the washing machine 10.

As a non-limiting example, the clothes dryer 12 can include a rotatably supported clothes drying drum 17 which is driven by an electrically energized motor 18. The motor 18, in addition to rotating the drum 17, can drive a centrifugal type blower 19 which causes air to flow through the clothes drying drum 17. In some configurations, a separate motor is provided for the blower 19. The dryer 12 can be provided with a heating system comprising at least one heating element 20 to heat the dry air flowing into the clothes drying drum 17. Like the washing machine 10, there can be two heating elements, one operable at 120V and another operable at 240V. As mentioned above, it is contemplated that other embodiments may have two 120V elements or a single variable output heating element in the clothes dryer 12.

Figure 2A:
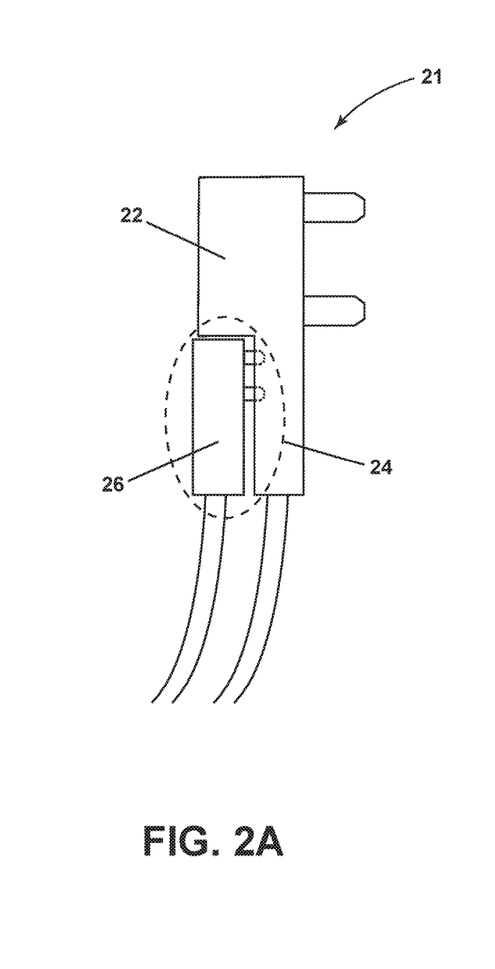
FIG. 2A is a side view of a washing machine terminal block in the form of a piggyback power plug with a dryer power plug connected to a rear facing electric socket of the piggyback power plug.
Figure 2B:
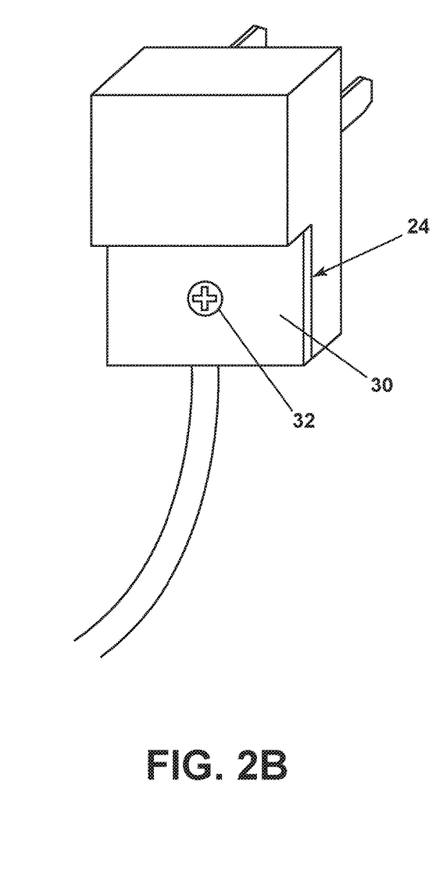
FIG. 2B is a rear perspective view of the piggyback plug of FIG. 2A with a cover member fastened on the rear facing electric socket.

Referring further to FIG. 1, the washing machine 10 includes in this embodiment a terminal block 21 in the form of a piggyback plug 22, configured to connect to a conventional electrical power source 25 of 240V. Referring to FIG. 2A, the piggyback plug 22 includes a rear facing electrical socket 24 with a unique terminal layout 26a, b (FIGS. 2C and 2D) designed only to receive a compatible dryer power plug 26. Referring to FIG. 2B, when not in use, the rear facing electrical socket 24 can be provided with a cover member 30 that can be fastened to the surface of the rear facing electrical socket 24 via a fastener 32.

The piggyback plug 22 in one embodiment allows for power sharing between the washing machine 10 and the dryer 12 from a single 240V power source 25 by way of a communication module 28, here illustrated as a generic communication between the washing machine 10 and the dryer 12. In this context, it will be understood that the communication module 28 includes all the circuitry needed to effectively enable data communication between the washing machine 10 and the dryer 12, including but not limited to wired or wireless communication, peer-to-peer or network communication, and with or without an intermediate server. Examples of such communication are found in U.S. Pat. No. 8,345,686 and U.S. Pat. No. 8,155,120, both of which are incorporated herein by reference.

Figure 2C:
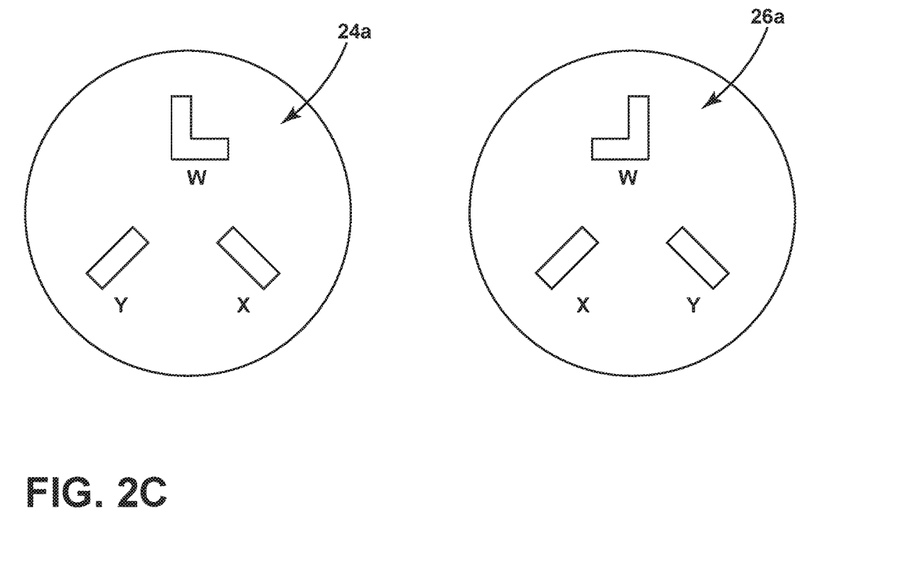
FIG. 2C is a schematic view showing receptacle and plug terminal blade configurations in a first embodiment for the piggyback plug of FIG. 2A.
Figure 2D:
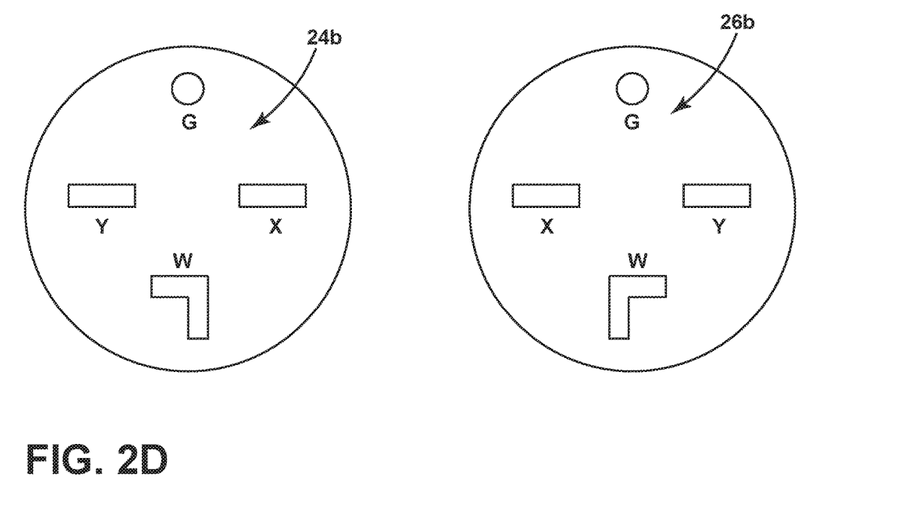
FIG. 2D is a schematic view showing receptacle and plug terminal blade configurations in a second embodiment for the piggyback plug of FIG. 2A.

As shown in FIGS. 2C and 2D, the power terminal blade layout 24a of the rear facing electrical socket 24 and the corresponding blade layout 26a of the dryer power plug 26 may be different from what is commonly used in the washing machine industry for a 3-prong connections. For another exemplary configuration, the terminal blade layout 24 b of the rear facing electrical socket 24 and the corresponding blade layout 26b of the dryer power plug 26 would be different from what is commonly used in the washing machine industry for a 4-prong connection. The blade configurations can be oriented differently in order to prevent the use of other existing power plugs with the rear facing electrical socket 24. Thus, the rear facing electrical socket 24 limits the power sharing feature to specific compatible dryers with compatible power plugs designed to work in conjunction with the washer 12 of the present embodiment.

Figure 3:
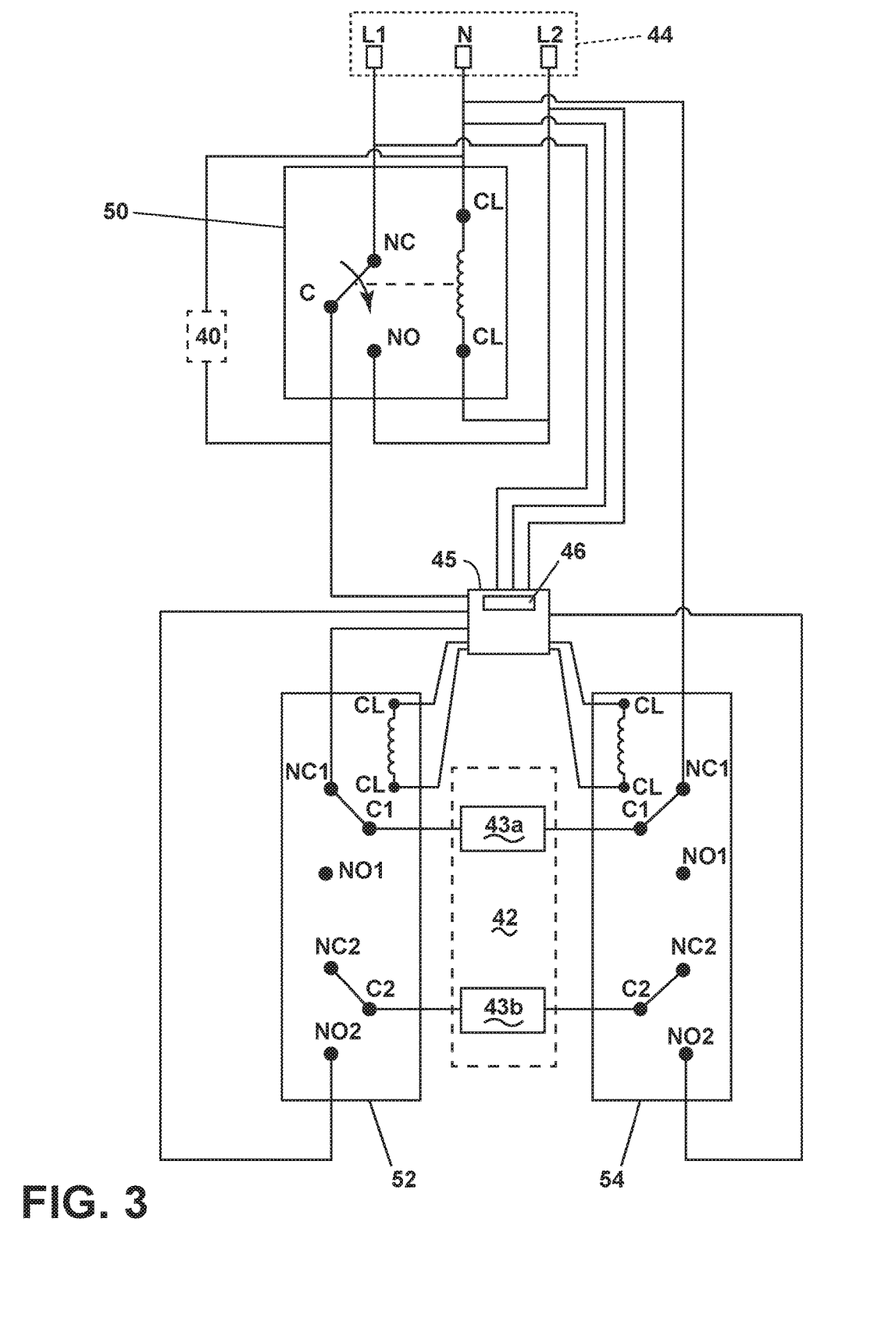
FIG. 3 is a circuit diagram showing the connections of the relay switches when the washing machine is connected to a 120V electrical power source.

Referring now to FIG. 3, the washing machine 10 further comprises a first electrical circuit 40 configured to operate motors 14 and pumps 15 associated with a clothes washing cycle. A second electrical circuit 42 is configured to operate the first heating element 43a or the second heating element 43b depending on an available or selected 120V or 240V power source, wherein the first heating element 43a is operable at 120V and the second heating element 43b is operable at 240V. The first and second electrical circuits 40, 42 are connected to one or more terminal blocks 44 that can adapted to be selectively connected to one of a 120V or 240V electric power source 25 (see discussion below). The terminal block 44 may be the piggy back terminal block 21 discussed above. A controller 45 coupled with a sensor 46 and adapted to sense the voltage from the terminal block 44 is coupled to a plurality of relay switches 50, 52, 54. The controller 45 is configured to energize or de-energize the relay switches 50, 52, 54 based on a signal from the sensor 46 to automatically adjust the first and second electrical circuits 40, 42 to the voltage from the terminal block 44. The controller 45 is further configured to reduce power consumed by the dryer 12 (FIG. 1) depending on the power usage of the washing machine 10 (FIG. 1) by way of the communication module 28 (FIG. 1) connecting the controller 45 to the clothes dryer 12.

The plurality of relay switches includes a single pole double throw (SPDT) relay switch 50 and two double pole double throw (DPDT) relay switches 52, 54 which are connected to the power source via leads L1-N-L2 in the terminal block 44, representing in this embodiment connections to a conventional 240V circuit in the U.S. The pair of terminals L1, L2 for connection to 120V/240V hot leads, and the terminal N being a machine ground terminal.

The SPDT relay switch 50 includes five terminal points: a normally open switch (NO), a normally closed switch (NC), a common of the relay (C), and two coil terminals (CL) that can be powered to open the switch. Each DPDT relay switch 52, 54 includes eight terminal points: first normally open switch (NO1), second normally open switch (NO2), first normally closed switch (NC1), second normally closed switch (NC2), first common of the relay (C1), second common of the relay (C2) and two coil terminals (CL) that can be powered to close the switches.

In FIG. 3, where 120V is drawn from the terminal block 44, the NC and NO terminals of the SPDT relay switch 50 are connected to L1 and L2 leads in the terminal block 44 respectively. The CL terminals are connected to L2 and N leads of the terminal block 44. The C terminal of the SPDT relay switch 50 is connected to the NC1 terminal of the first DPDT relay switch 52 through the controller 45. The corresponding C1 terminal of the first DPDT relay switch 52 is connected to the second circuit 42 where it forms a continuity with the C1 terminal of the second DPDT relay switch 54. The corresponding NC1 terminal of the second DPDT relay switch 54 is connected to the N lead of the terminal block 44. In this configuration, regardless of whether the CL terminals of the SPDT relay switch 50 are energized by the wiring of 120V via the L1 or L2 leads, the same power will be provided to the first circuit 40 and the 120V first heating element 43a of the second circuit 42. The SPDT relay switch 50 is adapted as a failsafe to selectively connect to a 120V electric power source regardless of the wiring using either L1 or L2 leads.

Figure 4:
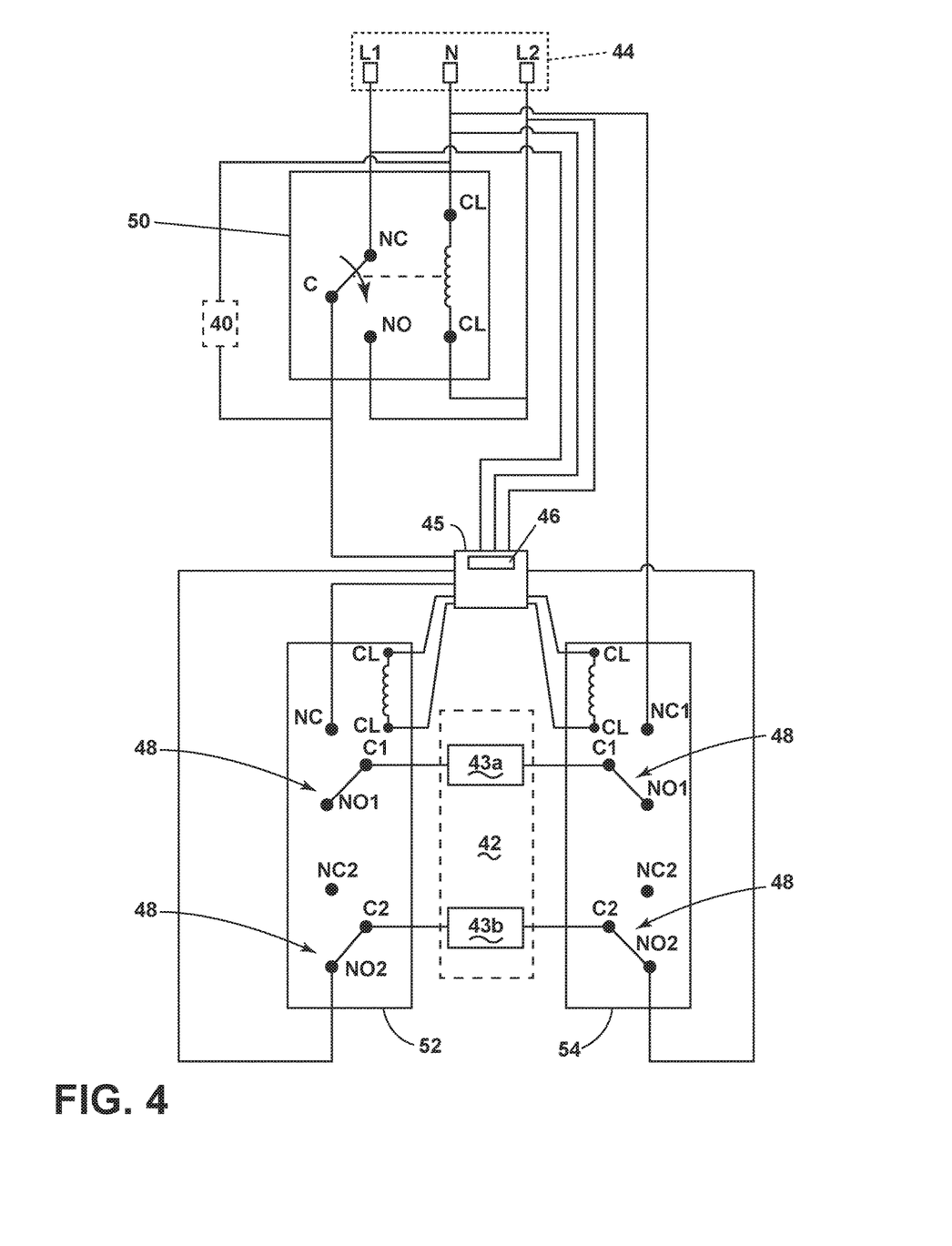
FIG. 4 is a circuit diagram showing the connections of the relay switches when the washing machine is connected to a 240V electrical power source.

Referring to FIG. 4, where 240V is drawn from the terminal block 44, the first circuit 40 will still receive 120V through the C terminal of the SPDT relay switch 50. On the other hand, the sensor 46 in the controller 45 will detect the available 240V and energize the CL terminals in both DPDT relay switches 52, 54 creating continuity between the C1, 2 and NO1, 2 terminals respectively. In this configuration, the 120V power source channeled through the C terminal of the SPDT relay switch 50 to the second circuit 42 will be cut off when the switches 48 in both DPDT relay switches 52, 54 shift to the NO1 and NO2 terminals. Instead, the controller 45 will provide continuity between L1 and L2 lead of the terminal block 44 through the NO2 terminals of the DPDT relay switches 52, 54 with their C2 terminals connected to the second heating element 43b of the second circuit 42. In this example, the washing machine has the capability to utilize 240V power source for the 240V-rated second heating element 43b. The 240V supply to the second heating element 43b of the second circuit 42 effectively reduces the overall current draw to the second circuit 42 under similar power conditions and has the opportunity to significantly increase the power output of the second heating element 43b while using the same or even less energy than the 120V supplied heating element 43a. The opportunity to utilize more power through the second heating element 43b translates to faster water heating while concurrently tumbling to promote a faster time to an acceptable washing performance.

The circuitry in FIGS. 3 and 4 can be used with or without power sharing between the washing machine 10 and dryer 12. Looking now at FIG. 5, the washing machine 10 will also typically include a controller 96 for controlling the operation of the washing machine 10 to implement one or more cycles of operation. A user interface 98 is operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

Figure 5:
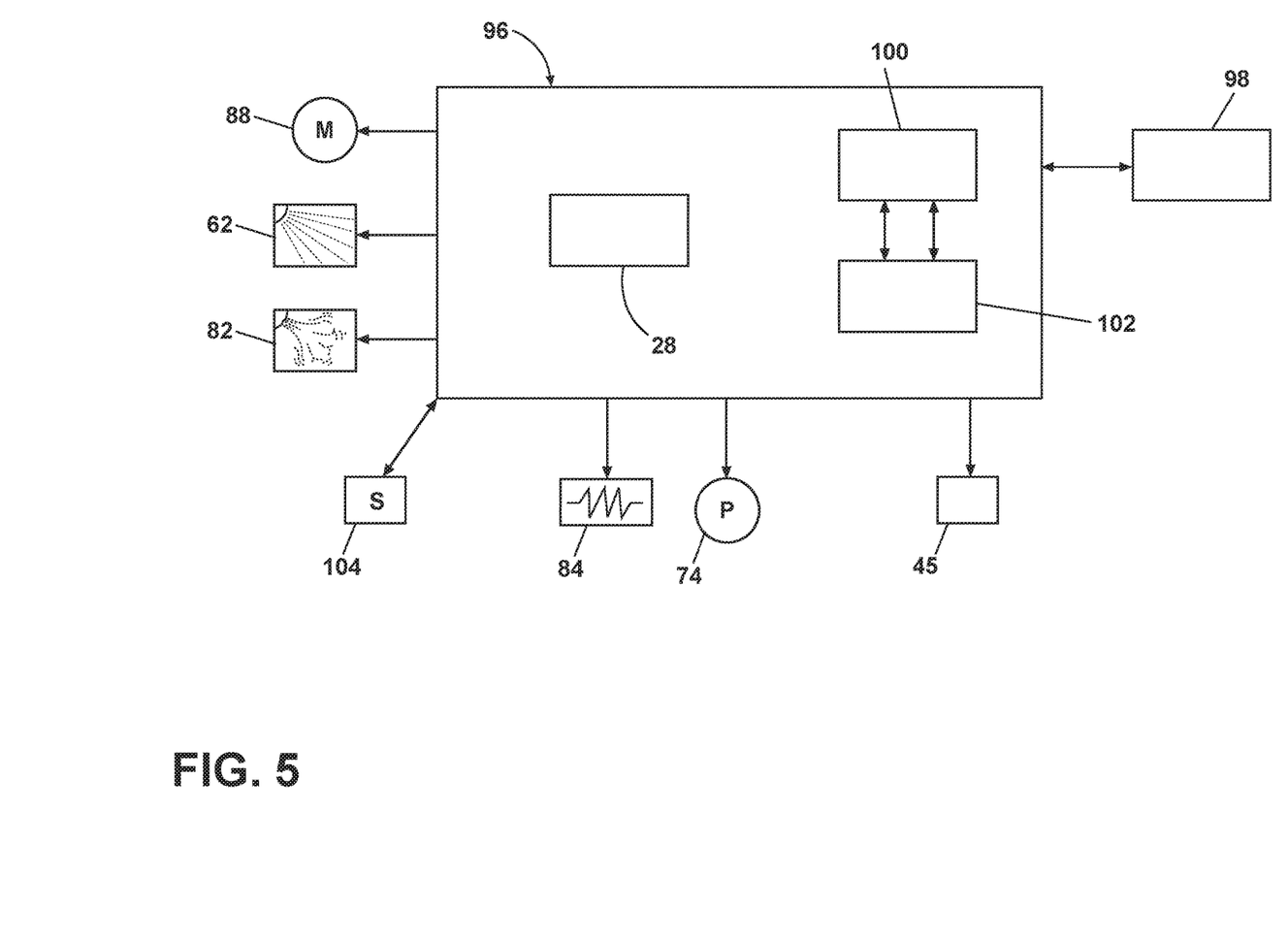
FIG. 5 is a block diagram of a controller for the washing machine of FIG. 1.

The controller 96 may include the machine controller and any additional controllers provided for controlling any of the components of the washing machine 10, including for example, the controller 45 in the first and second electrical circuits 40, 42. Many known types of controllers may be used for the controller 96. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

The controller 96 may be provided with a memory 100 and a central processing unit (CPU) 102. The memory 100 may be used for storing the control software that is executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input. The controller 96 may be provided with the communication module 28 to enable communication between the washing machine 10 and a dryer 12.

The controller 96 may be operably coupled with one or more components of the washing machine 10 for communicating with and controlling the operation of the component to complete a cycle of operation. For example, the controller 96 may be operably coupled with a motor 88, a pump 74, a dispenser 62, a steam generator 82 and a sump heater 84 to control the operation of these and other components to implement one or more of the cycles of operation. And the controller 96 can be operably coupled with the controller 45 to control operation of the heating elements 43a, 43b. It will be understood that the functions of the controller 45 can be incorporated into the controller 96, in which case the controller 45 may be superfluous and can be omitted.

The controller 96 may also be coupled with one or more sensors 104 provided in one or more of the systems of the washing machine 10 to receive input from the sensors, which are known in the art and not shown for simplicity.

Non-limiting examples of sensors 104 that may be communicably coupled with the controller 96 include: a treating chamber temperature sensor, a moisture sensor, a weight sensor, a chemical sensor, a position sensor and a motor torque sensor, which may be used to determine a variety of system and laundry characteristics, such as laundry load inertia or mass. And the controller 96 can be operably coupled with the sensor 46 adapted to sense the voltage from the terminal block 44.

For power sharing between the washing machine 10 and the dryer 12 via the terminal block 44, it will be understood that the dryer 12 will have a similar controller configured to at least determine cycle parameters in the dryer and communicate with the controller 96 and/or with the controller 45 in the washing machine 10. Either the controller 96 or the controller 45 (or both) is configured to receive signals representative of available power from the sensor 46, determine the status of components associated with a cycle of operation in the washing machine 10, communicate with the dryer 12 by way of the communication module 28, transmit data about the washing machine 10 to the dryer 12, receive data about the dryer 12 from the dryer 12, and negotiate with the dryer about scheduling or determining power needs for the heating elements 43a, 43b. For example, the controller 96 may have an algorithm to prevent electrical overloading by signaling the dryer 12 to reduce the electrical power consumed by the dryer 12 when simultaneous energization of the washing machine 10 and dryer 12 occurs. As the dryer 12 heating system includes two heating elements operable at 120V and 240V respectively, power consumption of the dryer can be reduced by the dryer controller activating the 120V heating element in the dryer 12 instead of the 240V heating element and the washing machine controller 96 activating the 120V heating element in the washing machine 10 instead of the 240V heating element.

Figure 6:
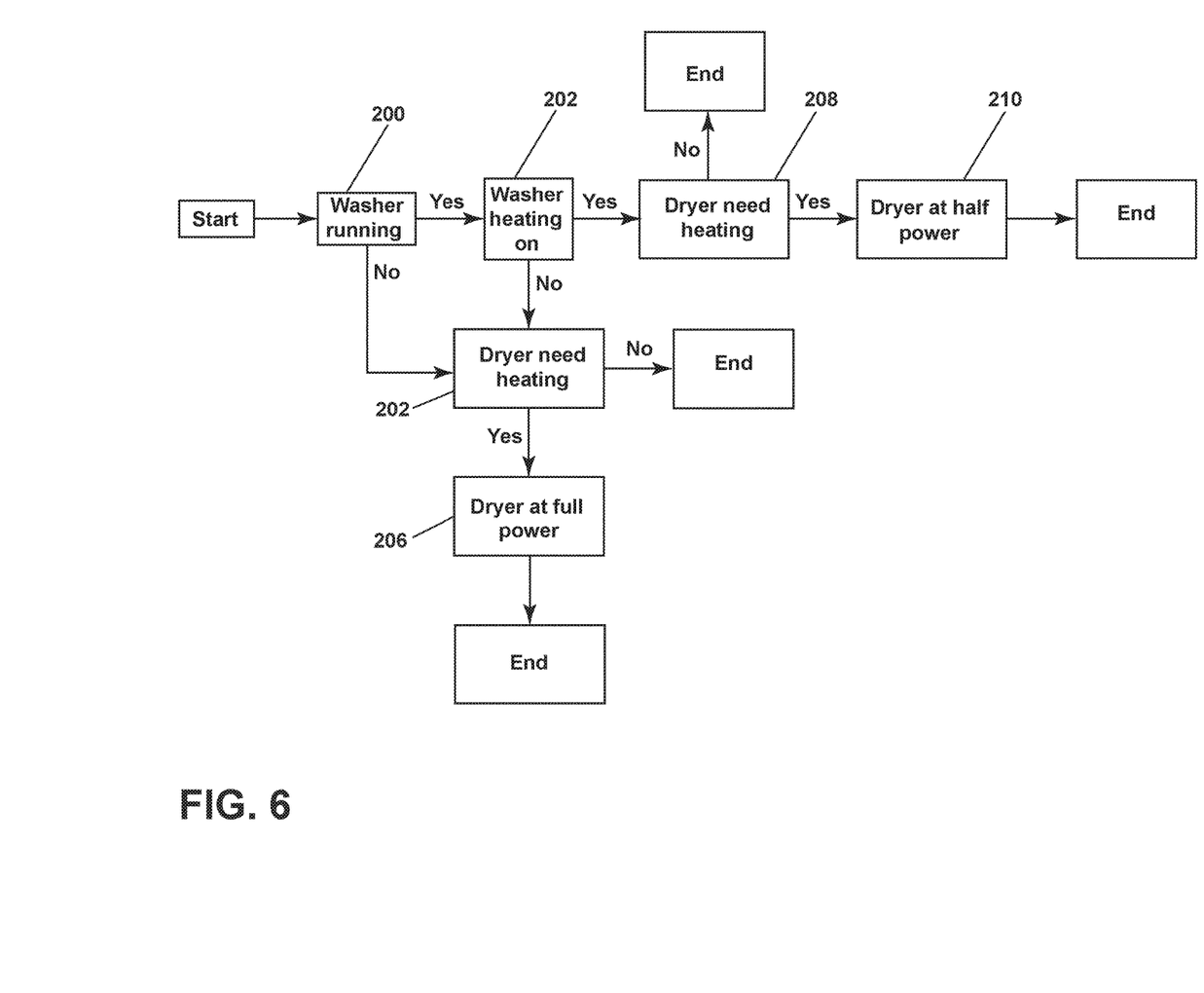
FIG. 6 is a block diagram of a method of power sharing to prevent electrical overloading when the dryer is energized while the washing machine is in operation.

Referring to FIG. 6 in an exemplary communication between the washing machine 10 and the dryer 12, provided that a 240V power source is available and power is to be shared between the washing machine 10 and the dryer 12, the controller 96 first determines at step 200 whether the washing machine 10 is running and, if so, at step 202 whether the at least one heater 16 in the washing machine 10 is energized. Meanwhile the controller 96 will have received data from the dyer 12 indicating the status of the at least one heater in the dryer 12. If the washing machine 10 is not running, or if the at least one heater 16 in the washing machine 10 is not energized, the controller 96 determines at step 204 the status of the at least one heater in the dryer 12 and signals the dryer at step 206 that it can operate at full power. If the at least one heater 16 in the washing machine 10 is energized, the controller 96 determines at step 208 the status of the at least one heater in the dryer 12 and signals the dryer at step 210 that it can operate at full power, e.g., 240V, or a reduced power, e.g., 120V.

Figure 7:
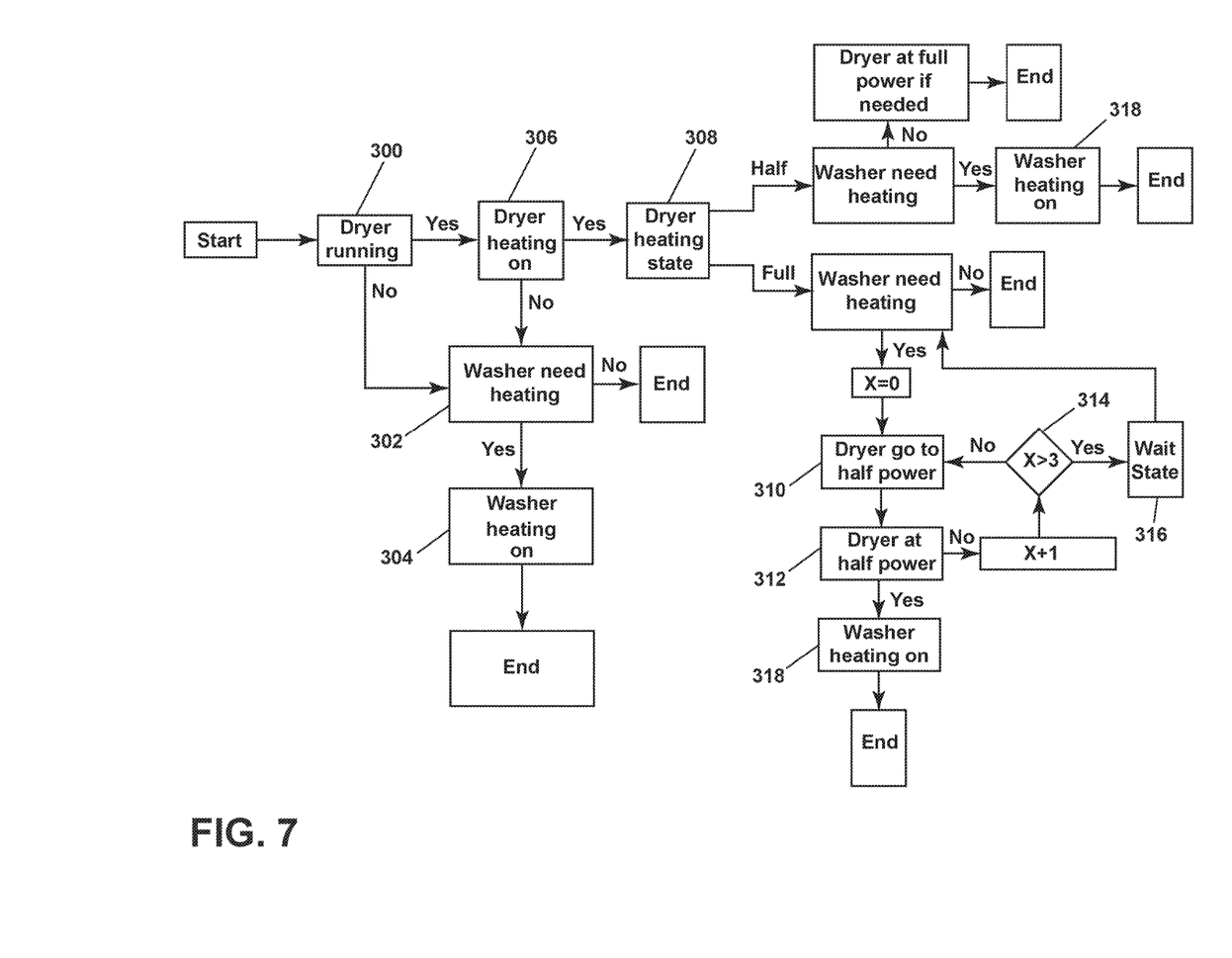
FIG. 7 is a block diagram of a method of power sharing to prevent electrical overloading when the washing machine is energized while the dryer is in operation.

Referring to FIG. 7 in another exemplary communication between the washing machine 10 and the dryer 12, when the washing machine 10 is energized the controller 96 determines at step 300 whether the dryer 12 is running. If not, then the controller 96 determines at step 302 if a cycle of operation needs the at least one heater 16 in the washing machine to be energized. If so, at step 304 the controller 96 signals directly (or indirectly through controller 45) to energize one or both of the heating elements 43a, 43b. If the controller 96 determines at step 300 that the dryer 12 is running, it then determines (via communication with the dyer 12) whether the heating element in the dryer is energized at step 306. If the heating element in the dryer is not energized, then the controller 96 determines at step 302 if a cycle of operation needs the at least one heater 16 in the washing machine to be energized. If the heating element in the dryer is determined to be energized at step 306, then then the controller 96 determines at step 308 the state of the heating element 20 in the dryer 12, e.g., if the dryer heating element is operating at 120V (half power) or 240V (full power). If the washing machine needs heating when the dryer is operating 240V at full power, the controller 96 can signal the dryer 12 at step 310 to operate at half power (e.g., with the 120V heating element). The controller 96 further validates at step 312 whether the dryer operates at the reduced power. If reduced power in the dryer 10 is validated, the controller 96 can signal the heating element 16 in the washing machine 10 at step 318 to go to full power (e.g., 240V). The instruction step at 310 and the validation step at 312 can cycle up to three times at 314 before the controller 96 enters a waiting state at step 316 if the dryer fails to operate at reduced power. This safety measure in the method prevents activation of the washing machine 240V heating element when the dryer is also operating with a 240V heating element to prevent electrical overload. If the washing machine needs heating when the dryer is operating at half power, the controller 96 can signal the dryer 12 at step 318 to energize the heater in the washing machine 10 at reduced power (e.g., 120V), and if not, the controller 96 can signal the dryer 12 at step 320 to energize the heater in the dryer 12 at full power (e.g., 240V).

The washing machine of the present embodiment can be connected safely to either 120V or 240V electrical power source with the capability to share the same power source with the dryer through the piggyback plug. The power sharing capability allows for the heating system in the washer to be supplied with 240V to expedite heating when there is no demand from the dryer, improving overall efficiency between the washing and drying performance. The power sharing algorithm protects the washing machine and dryer from overloading the power source to maintain a stable simultaneous operation of both appliances using the same power source.

Figure 8A:
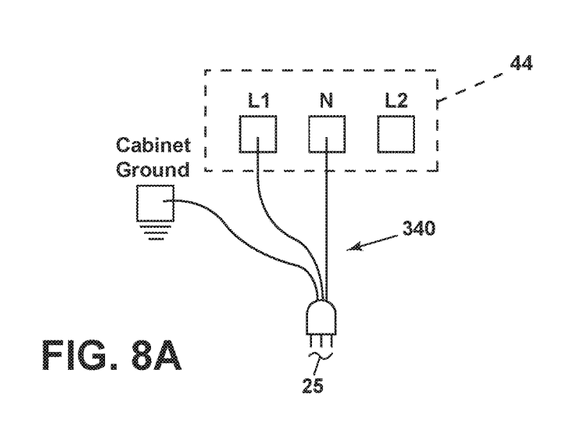
FIGS. 8A-8D are schematic views of different cord configurations available for different washing machine terminal blocks.
Figure 8B:
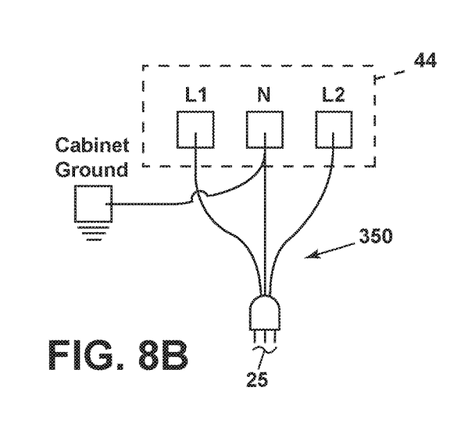
Figure 8C:
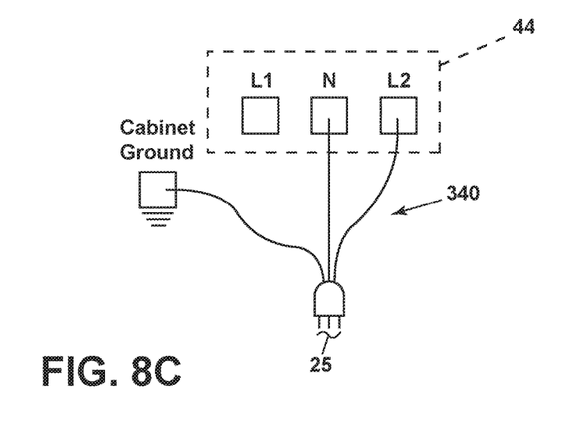
Figure 8D:
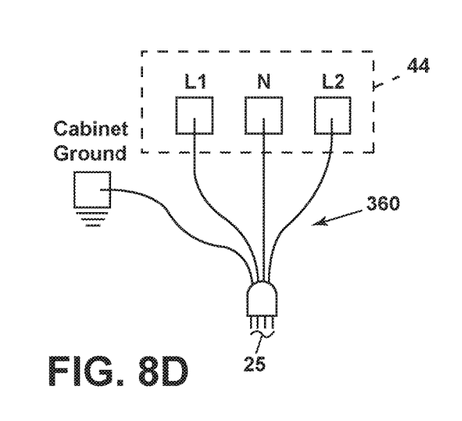

In another aspect related to the washing machine, FIGS. 8a-8d illustrate different possible cord configurations available to a user for selection with the terminal block 44. In FIGS. 8A and 8C, a user can select a 120V AC cord 340 with a 3-prong plug for connection between the terminal block and the power source 25 at a conventional 120V receptacle, with one end plugged into the L1 lead of the terminal block 44 (FIG. 8A) or the one end plugged into the L2 lead of the terminal block 44 (FIG. 8C). In FIG. 8B, a user can select a 240V 20 amp AC three-wire cord 350 with a 3-prong plug for connection between the terminal block 44 and the power source 25 at a conventional 240V receptacle. In FIG. 8D, a user can select a 240V 20 amp AC four-wire cord 360 with a 4-prong plug for connection between the terminal block 44 and the power source 25 at a conventional 240V receptacle. In another embodiment (not shown), the terminal block 44 can include two terminal blocks on the washer to provide connection to either a 120V power source or a 240V power source at a user's choice, where one is a conventional 120V block and the other is a conventional 240V block. While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims. For example, with respect to heater elements in the laundry treating appliance, it is within the scope of the disclosure for there to be two heater elements, each operating at 120V with either heater element switched on or off depending on available power, or for there to be a single heater element configured to operate at either 120V or 240V depending on available power. It is also within the scope of the disclosure for power sharing between the washing machine and the dryer to include the heater elements in each appliance to draw full power at 240V, but where the power is pulsed or switched between them so only one is drawing full power at a time.

What is claimed is:

1. A washing machine adapted to interoperate with a dryer, the washing machine comprising:
   a laundry treating chamber;
   a terminal block adapted to connect to a 240V power supply;
   at least one heating element to provide heat to the laundry treating chamber;
   an electrical circuit between the terminal block and the at least one heating element; and
   a controller connected to the electrical circuit and configured to control cycles of operation of the washing machine and to communicate with the dryer;
   wherein the controller is configured to switch operation of the washing machine between two power levels in response to operational characteristics of the dryer.

2. The washing machine of claim 1 wherein the controller is configured to switch operation of the washing machine between two power levels by energizing or de-energizing heating elements.

3. The washing machine of claim 2 wherein the controller has a communication module adapted to form a connection between the dryer and the washing machine and the controller is further configured to reduce power consumed by the dryer depending on a power usage of the washing machine.

4. The washing machine of claim 2 further comprising a power plug adapted to connect the washing machine to a generic electric receptacle.

5. The washing machine of claim 4 wherein the power plug is a piggyback power plug having a rear facing electric socket.

6. The washing machine of claim 5 wherein the piggyback power plug includes a cover member to protect the rear facing electric socket when not in use.

7. The washing machine of claim 6 wherein the cover member can be secured via a fastener.

8. The washing machine of claim 5 wherein the rear facing electric socket includes a unique power terminal layout configured to receive a compatible clothes dryer power plug.

9. The washing machine of claim 8 wherein the power plug is adapted to receive the compatible clothes dryer power plug to allow power sharing from a single power source.

10. The washing machine of claim 3 wherein the controller automatically reduces electrical power consumed by the washing machine when simultaneous energization of the washing machine and dryer occurs.

* * * * *